(12) United States Patent
Collins

(10) Patent No.: US 7,404,269 B2
(45) Date of Patent: Jul. 29, 2008

(54) INSECT COLLECTOR AND VIEWER

(76) Inventor: Michael R. Collins, 25 Chesterfield Rd., Bedford, NH (US) 03110

( * ) Notice: Subject to any disclaimer, the term of this patent is extended or adjusted under 35 U.S.C. 154(b) by 0 days.

(21) Appl. No.: 11/541,384

(22) Filed: Sep. 28, 2006

(65) Prior Publication Data

US 2007/0169403 A1    Jul. 26, 2007

Related U.S. Application Data

(60) Provisional application No. 60/721,273, filed on Sep. 28, 2005.

(51) Int. Cl.
 *A01M 1/06* (2006.01)
(52) U.S. Cl. .......................................................... 43/139
(58) Field of Classification Search ..................... 43/139
See application file for complete search history.

(56) References Cited

U.S. PATENT DOCUMENTS

| | | | | |
|---|---|---|---|---|
| 289,997 A * | 12/1883 | Luze | ............................ | 43/139 |
| 454,720 A * | 6/1891 | Dexter | .......................... | 43/139 |
| 738,184 A * | 9/1903 | Goodwin | ...................... | 43/139 |
| 923,368 A * | 6/1909 | Myser | .......................... | 43/139 |
| 959,155 A * | 5/1910 | Nault | ............................ | 43/139 |
| 993,644 A * | 5/1911 | Brisbane | ...................... | 43/139 |
| 1,071,620 A * | 8/1913 | Kingsland | .................... | 43/139 |
| 1,141,039 A * | 5/1915 | Cox | ............................... | 43/139 |
| 1,158,542 A * | 11/1915 | Noonan | ........................ | 43/139 |
| 1,308,497 A * | 7/1919 | Jolly | ............................. | 43/139 |
| 1,797,557 A * | 3/1931 | Stine et al. | ..................... | 43/139 |
| 1,807,550 A * | 5/1931 | Rector | .......................... | 43/139 |
| 1,819,551 A * | 8/1931 | Gourden | ....................... | 43/139 |
| 2,384,930 A * | 9/1945 | Kendrick | ...................... | 43/139 |
| 2,567,616 A * | 9/1951 | Moore | .......................... | 43/139 |
| 2,569,722 A * | 10/1951 | Knox | ........................... | 43/139 |
| 2,806,321 A * | 9/1957 | Blackman | ..................... | 43/139 |
| 2,829,384 A * | 4/1958 | Studler | ........................ | 43/139 |
| 2,879,620 A * | 3/1959 | McGinnis | ..................... | 43/139 |
| 2,992,770 A * | 7/1961 | Keiser | .......................... | 43/139 |
| 3,214,861 A * | 11/1965 | Arther | .......................... | 43/139 |
| 3,231,997 A * | 2/1966 | Shugarman | ................... | 43/139 |

(Continued)

FOREIGN PATENT DOCUMENTS

DE          3225330 A1 *   1/1984

(Continued)

*Primary Examiner*—Darren W Ark
(74) *Attorney, Agent, or Firm*—Hayes Soloway PC

(57) ABSTRACT

The invention is directed to an insect collection and viewing device comprising a negative air pressure generating assembly including a motor and a fan driven by the motor and a suitably shaped collection nozzle. A viewing chamber is coupled intermediate the collection nozzle and the negative air pressure assembly. The viewing chamber is tubular in shape and has an air permeable-insect impermeable screen at the downstream opening thereof and a movable valve/lens at the upstream opening thereof. When the valve/lens is open an air flow is established through the device. The air flow path is from the nozzle through the viewing chamber into and out of the assembly. In operation insects of interest are captured by sucking the insect into the device through the nozzle, then through the open valve/lens into the viewing chamber where it is captured between the screen and the closed valve. By making the valve in the shape of a transparent lens the trapped insect may be inspected through the magnifying lens.

7 Claims, 3 Drawing Sheets

U.S. PATENT DOCUMENTS

| | | | | |
|---|---|---|---|---|
| 3,330,063 | A * | 7/1967 | Lockwood | 43/139 |
| 3,711,987 | A * | 1/1973 | Fisk | 43/139 |
| 3,750,327 | A * | 8/1973 | Thybault | 43/139 |
| 3,965,608 | A * | 6/1976 | Schuman | 43/139 |
| 4,074,458 | A * | 2/1978 | Catlett | 43/139 |
| 4,106,438 | A * | 8/1978 | Nelson | 43/139 |
| 4,141,174 | A * | 2/1979 | Smith | 43/139 |
| 4,175,352 | A * | 11/1979 | Catlett | 43/139 |
| 4,279,095 | A * | 7/1981 | Aasen | 43/139 |
| 4,449,319 | A * | 5/1984 | Garcia | 43/139 |
| 4,488,331 | A * | 12/1984 | Ward | 43/139 |
| 4,602,846 | A * | 7/1986 | Karnes | 15/105 |
| 4,607,451 | A * | 8/1986 | Jarecki | 43/139 |
| 4,614,003 | A * | 9/1986 | Martin | 15/339 |
| 4,631,858 | A * | 12/1986 | Kahle | 43/139 |
| 4,733,495 | A * | 3/1988 | Winnicki | 43/139 |
| 4,780,986 | A * | 11/1988 | Broomfield et al. | 43/139 |
| 4,794,725 | A * | 1/1989 | Numerick | 43/139 |
| 4,817,330 | A * | 4/1989 | Fahringer | 43/139 |
| 4,858,376 | A * | 8/1989 | Reed | 43/139 |
| 4,918,857 | A * | 4/1990 | Wade et al. | 43/139 |
| 4,927,284 | A * | 5/1990 | Tsai | 15/214 |
| 4,979,330 | A * | 12/1990 | Rorant | 43/139 |
| 5,052,147 | A * | 10/1991 | Broomfield et al. | 43/139 |
| 5,106,492 | A * | 4/1992 | Distinti et al. | 15/1.7 |
| 5,175,960 | A * | 1/1993 | Wade et al. | 43/139 |
| 5,195,209 | A * | 3/1993 | Watkins | 15/339 |
| 5,222,322 | A * | 6/1993 | Mastromonaco | 43/139 |
| 5,305,495 | A * | 4/1994 | Nelsen et al. | 43/139 |
| 5,333,342 | A * | 8/1994 | Huang | 15/105 |
| 5,367,821 | A * | 11/1994 | Ott | 43/139 |
| 5,402,598 | A * | 4/1995 | Wade et al. | 43/139 |
| 5,618,289 | A * | 4/1997 | Aragona et al. | 15/105 |
| 5,655,253 | A * | 8/1997 | Nevin et al. | 15/310 |
| 5,768,748 | A * | 6/1998 | Silvera et al. | 15/402 |
| 5,915,950 | A * | 6/1999 | Kleinhenz | 43/139 |
| 6,086,682 | A * | 7/2000 | Anderson | 15/402 |
| 6,202,343 | B1 * | 3/2001 | Mah | 43/139 |
| 6,226,919 | B1 * | 5/2001 | Septer | 43/139 |
| 6,568,125 | B2 * | 5/2003 | Kleinhenz | 43/139 |
| 6,640,489 | B1 * | 11/2003 | Boulton | 43/139 |
| 6,651,380 | B2 * | 11/2003 | Wyers | 43/139 |
| 7,152,365 | B2 * | 12/2006 | Wyers | 43/139 |
| 2005/0246944 | A1 * | 11/2005 | Flowers | 43/139 |
| 2005/0246945 | A1 * | 11/2005 | Evink | 43/139 |
| 2006/0218851 | A1 * | 10/2006 | Weiss et al. | 43/139 |
| 2007/0074447 | A1 * | 4/2007 | Kalogroulis | 43/139 |

FOREIGN PATENT DOCUMENTS

| | | | |
|---|---|---|---|
| DE | 4112266 C1 | * | 5/1992 |
| DE | 4327150 A1 | * | 2/1995 |
| DE | 102006058992 A1 | * | 7/2007 |
| EP | 129504 A1 | * | 12/1984 |
| EP | 941660 A1 | * | 9/1999 |
| EP | 1040756 A1 | * | 10/2000 |
| GB | 2236467 A | * | 4/1991 |
| GB | 2351645 A | * | 1/2001 |
| JP | 2001025344 A | * | 1/2001 |
| JP | 2004337019 A | * | 12/2004 |
| SU | 1644858 A | * | 4/1991 |
| WO | WO 92/07461 A1 | * | 5/1992 |
| WO | WO 2004060057 A1 | * | 7/2004 |

* cited by examiner

INSECT COLLECTOR AND VIEWER

CROSS-REFERENCE TO RELATED PATENT APPLICATIONS

This application claims the benefit of Provisional Patent Application Ser. No. 60/721,273 filed Sep. 28, 2005, the disclosure of which is incorporated in its entirety hereinto by reference.

BACKGROUND OF THE INVENTION

This invention pertains to a vacuum operated insect collection and viewing device. In particular, the arrangement of the invention is designed to make it easy for children and others having an interest to explore their natural curiosity about insects, without touching or killing them and with comparative safety from being bitten or stung by them.

The prior art has many examples of devices which develop a vacuum for the purpose of trapping, collecting and disposing of insects. Insects such as flies, mosquitoes, beetles, spiders have long been considered pests and marked for destruction. Flying insects are considered a particular nuisance, especially when present in the home, dining or food handling establishments. For many years it has been commonplace to use sprays, fly swatters, fly paper, insecticides and various other remedies to deal with unwanted insects.

There are known devices that are operated by a vacuum to capture insects and deposit them in a bag or some other cleanable collection element for later disposal. Such devices normally use an elongated funnel of some sort which is put under a negative pressure, and brought near enough to the insect for the insect to be suctioned into the funnel and then into a bag or other container to be subsequently disposed of at a later time.

While some components of the invention are common to arrangements in the prior art, the purpose of the invention is, in essence, quite distinct from the purpose of the aforementioned prior art devices. The object of the invention is not to kill the insect being captured but rather to afford an opportunity to examine, study and investigate the physical makeup of the insect of interest. In this regard, it has particular utility for those studying insects, and an innate usefulness as a toy or educational device for children who have an natural inclination to capture and observe insects. The invention provides provides just such opportunity to capture insects without harming them. It furthermore provides a means to capture and study insects without touching them and with ease and a high degree of safety from insect bites. Even dangerous stinging insects can be handled and studied using the device with a general avoidance of fear in the process.

BRIEF SUMMARY OF THE INVENTION

The above purposes are achieved in a live insect capture and viewing arrangement intended to allow safe and easy capture, viewing and examination of insects. The arrangement comprises a negative air pressure generating assembly including a motor and a fan driven by the motor and a suitably shaped collection nozzle. A viewing chamber is coupled intermediate the collection nozzle and the negative air pressure generating assembly. The viewing chamber is tubular in shape and has an air permeable, insect impermeable screen at the downstream opening thereof and a movable valve at the upstream opening thereof. When the valve is open, an air flow is established through the device. The air flow path is from the nozzle through the viewing chamber into and out of the vacuum generating assembly. The valve may be in the form of a rotatable lens that permits examination of insects captured in the viewing chamber. In operation, insects of interest are captured by sucking the insect into the device through the nozzle, then through the open valve/lens into the viewing chamber where it is captured between the screen and the closed valve.

BRIEF DESCRIPTION OF THE DRAWINGS

A complete understanding of the present invention will be had by reference to the accompanying drawings, when considered in conjunction with the subsequent, detailed description in which.

DETAILED DESCRIPTION OF THE INVENTION

Figure 1:
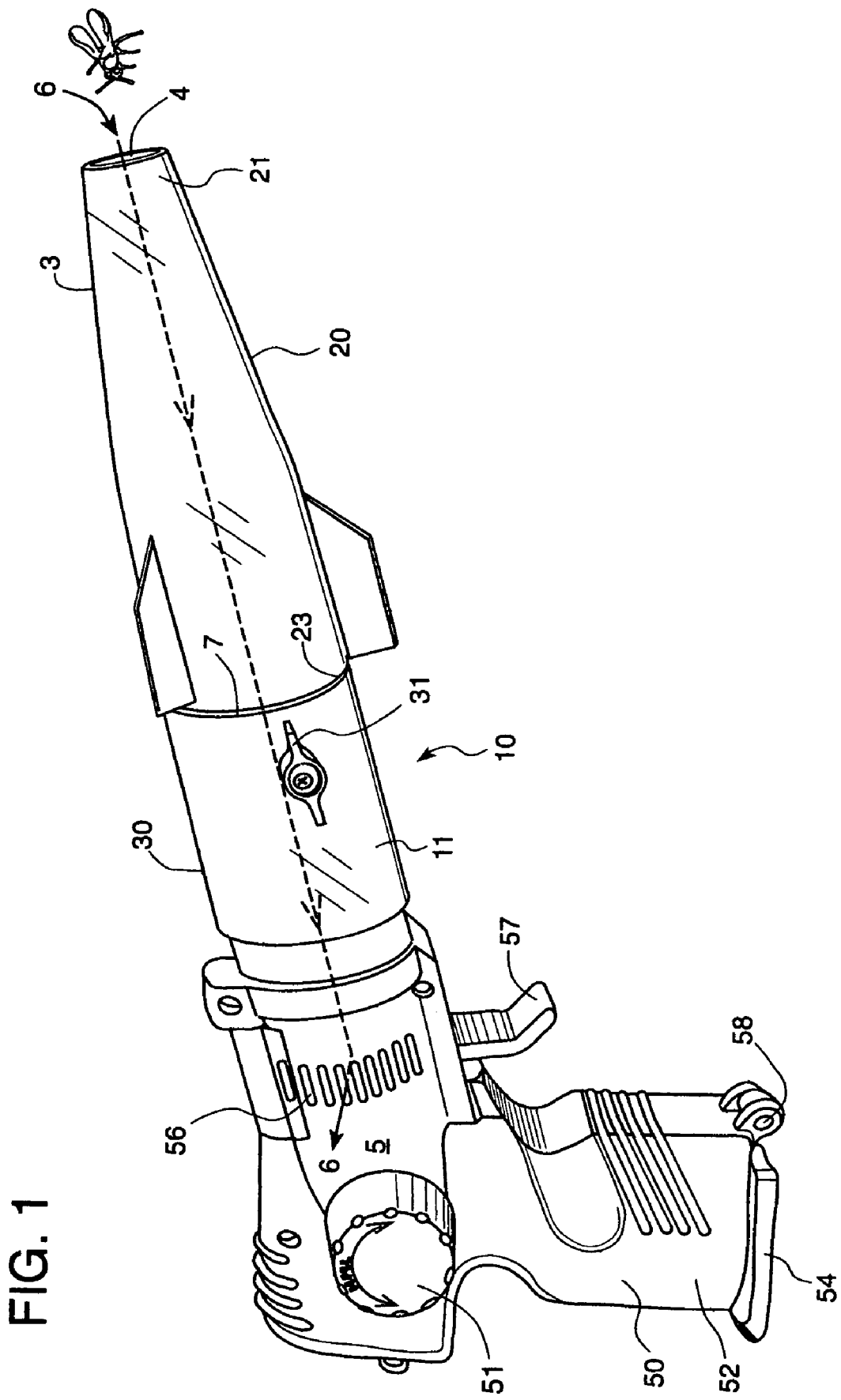
FIG. 1 is a perspective view of the exterior of the insect collector and viewing arrangement of the invention.
Figure 2:
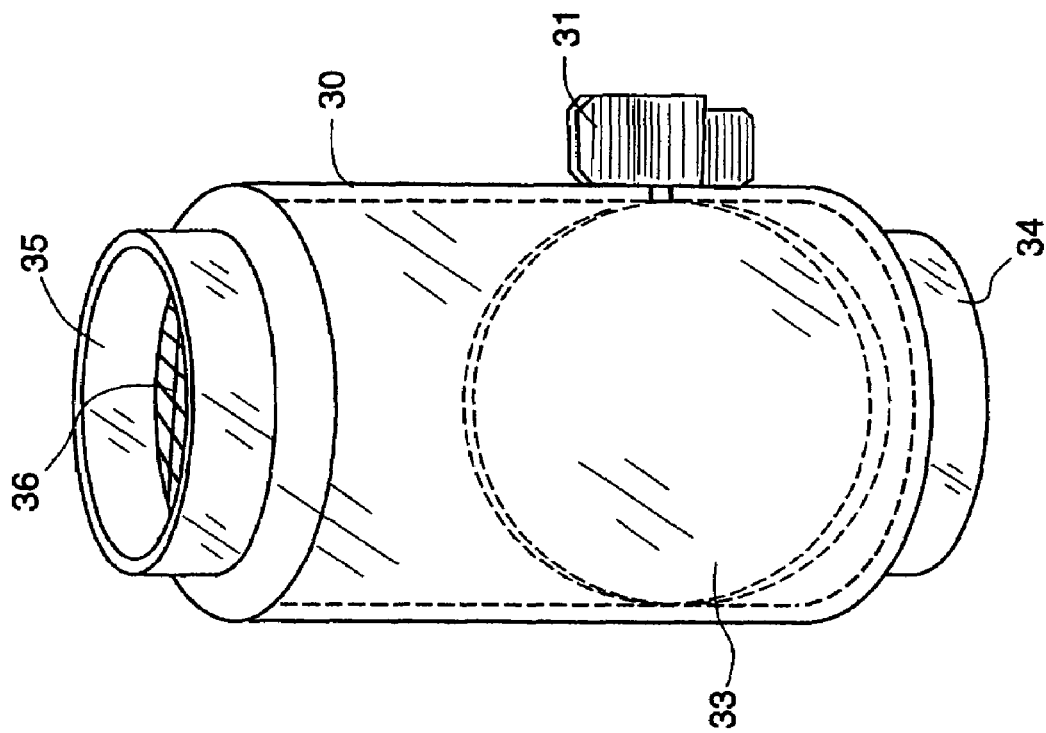
FIG. 2 is a perspective view of the transparent viewing chamber and rotatable valve/lens.
Figure 3:
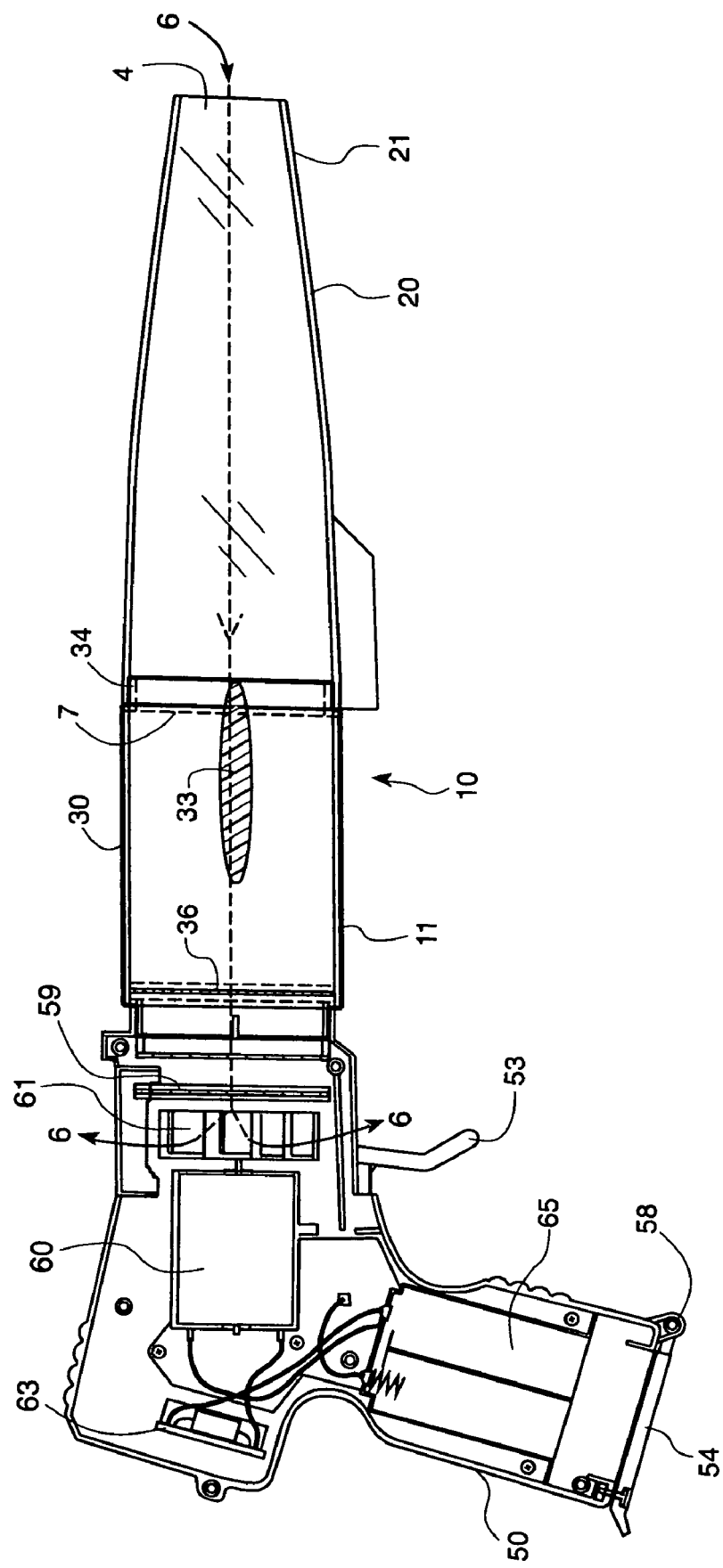
FIG. 3 is a sectional side elevation view of the insect collection and viewing device

As seen from the several views, the insect collection and viewing arrangement 10 of the invention generally takes the overall form of a battery powered pistol or gun. The arrangement 10 comprises a housing 11 formed of three main components; a nozzle 20, a viewing chamber 30 and a fan assembly 50. The above three components are coupled together from a front or upstream end 3 to a rear or downstream end 5 to form a continuous air flow path 6 from the front to the rear of the device.

The nozzle 20 may take one of many possible generally tubular shapes characterized by an intake opening 4 at the front, a generally cylindrical cross section throughout and a rear opening 7. The intake opening 4 functions to capture insects, as illustrated. The size and shape of the intake opening 4 is selected to be appropriate for the size and shape of the insect to be captured. Thus, for catching small insects a correspondingly small opening 4 would be used, while for catching a relatively large insect, such as a butterfly, a correspondingly large opening 4 would be provided.

The rear opening 7 of the nozzle may be selectively attached to or detached from the front of the viewing chamber 30 and has suitable formations thereon for this purpose. One of the many standard mechanical quick-connect coupling arrangements or alternatively a simple friction fit between parts may be utilized for this purpose.

The viewing chamber 30 couples the nozzle 3 to the fan assembly 50, has a generally cylindrical cross section and is made of a transparent material to allow viewing of its interior. The chamber has a combination valve/magnifying lens 33 near the upstream end thereof and mounted for rotation from radially opposite walls portions of the chamber near the upstream end thereof. The combination valve/lens 33 is rotatable in its mounting by a manually operated handle 31 connected to the valve/lens by a shaft mounted in the wall of the chamber. The diameter of the lens is selected to be only slightly smaller than the inside diameter of the viewing chamber. The downstream end of the viewing chamber has a screen 36 to prevent insects or other items from being drawn into the rotating fan. Because of the screen 36 insects sucked into the viewing chamber thru the front opening in the chamber are not able to escape from the rear of the chamber. In addition, the screen prevents other small particles from being drawn into the rotating fan. The valve/lens may be rotated to a position perpendicular to the axis of the viewing chamber in which position it substantially limits or cuts off the airflow 6 and blocks insects from entering or exiting the viewing chamber. The valve/lens 33 may be rotated by using the handle 31 to a position parallel with the axis of the viewing chamber. In this position it creates a maximum opening at the front or the upstream side of the chamber and thereby permits a maximum flow of air into the housing through the opening of the nozzle and also presents a minimum impediment to insects of interest to be sucked into the viewing chamber, as will be appreciated from the remainder of the description. The valve/lens is preferably standard in construction and operates to a dual purpose when in its closed position. In its closed position it operates to provide a magnified view of the interior of the viewing chamber and any captured insects which have entered the chamber. In its closed position it also functions as a valve or gate to close off the front of the chamber to thereby prevent additional objects (including insects) from entering through the front of the chamber. Detents are suitably placed on the lens or the inside of the chamber to hold it in the closed and open positions.

The fan assembly 50 is located at the rear of the device and contained in the rear portion 52 of the housing 11 that is generally in the shape of the pistol grip and trigger portions of a standard pistol. The rear portion 52 of the housing is selectively attachable to and detachable from the rear of the viewing chamber 30 by means of a standard friction fit or quick-connect mechanical coupling arrangement. The large rectangular descending section of the housing 52 serves as a battery compartment for holding suitable batteries 65 to power the fan assembly 50. Mounted in the rear portion 52 of the housing near the end of the elongated airflow path 6 formed by the nozzle and viewing chamber are a motor 60 and fan 61, the fan being driven by the shaft of the motor 60. The fan 61 rotates to create (when the valve/lens 33 is in the open position) a vacuum that draws air through the front opening 4 of the nozzle 20, along the axis of the housing 11, through the viewing chamber 30, and out the rear of the housing, as shown in the drawings. The vacuum is adjustable by means of a standard motor speed control including a rotatable potentiometer or multi-position switch 51 and circuit elements mounted on a pc board 63 to allow several distinct speeds or a continuously variable speed for the motor 60. The potentiometer 51 is marked for the user to select on of a high, medium or low speed. In this manner, the vacuum is adjustable by means of the motor speed control to allow gentlest capture with use of slowest speed and aggressive capture at the higher speeds. A trigger 53 is provided to turn the fan motor assembly on and off. The adjustable potentiometer has selectable high, medium and low speed setting. This allows the user of the device to tailor the vacuum to the type of insect of interest.

The child/user of the toy then operates the valve and traps the insect in the chamber 30. The nozzle may then be removed, and the chamber may also be removed from the gun (with screen), resulting in a small package that humanely stores the bug for viewing. In addition to being able to view the bug through the transparent cylindrical walls and screen of the viewing chamber, the valve itself is a magnifying lens that allows even closer detailed viewing of whatever has been captured in the chamber. Vacuum insect capture systems are well know in the prior art, as illustrated in U.S. Pat. Nos. 5,222,322 and 6,226,919, the disclosures of which are incorporated by reference herein. The differences between the fan assembly of this invention and those disclosed in the referenced patents are primarily related to making the assembly disclosed herein more suitable as a toy and an educational device. Thus, small size lightness and small cost of the components have been emphasized.

In operation, when the unit is turned on by engaging the trigger switch 53, the fan assembly 50 turns on the fan and creates a vacuum or negative pressure air stream from the opening 4 in the nozzle 20, through the viewing chamber 30 and exhaust slots 56 at the rear of the unit. A suction is felt all along the air path 6 thru the device. The vacuum thus created pulls insects of interest into and through the nozzle through the open-positioned valve/lens 33 into the viewing chamber 30 where viewing and study of the insect may be done through the lens 33 of the chamber. The chamber may be removed from the nozzle 20 and the fan assembly housing 52 to allow the transport of the insect without the need for these more bulky components. Finally, the insect may be released without physical harm.

Those skilled in the art will recognize that numerous alternatives encompassing many variations may readily be employed without departing from the scope of the present invention as set forth in the claims herein.

What is claimed is:

1. An insect collection arrangement comprising a vacuum generator to establish an air stream through the insect collection arrangement from an opening at an insect collection end through the insect collection arrangement and out a vacuum generator end, a viewing chamber connected in the air stream between the vacuum generator end and the insect collection end, said viewing chamber being transparent and having upstream and downstream openings, the downstream opening coupled to the generator and having a screen located across said air stream and sized to allow air to pass but block the passage of insects of interest, the upstream opening having a valve movable to at least a first position astride the air stream to allow a maximum flow of air and a second position perpendicular thereto to minimize flow of air, said chamber adapted to decouple from the generator to hold the captured insect separate from the generator, wherein said valve is a magnifying lens usable to examine a captured insect in the chamber in a magnified form.

2. The arrangement of claim 1 further including a nozzle for capturing the insect of interest, said nozzle coupled to the upstream opening of said chamber.

3. An insect collection and viewing device comprising a power assembly housing including a fan, an electric motor for driving the fan, and a switch for operating the motor, said power assembly housing having an inlet opening and an outlet opening, said fan adapted to produce a negative air pressure at said inlet opening, a transparent collection housing having a rear opening adapted for coupling to the inlet opening of said power assembly housing, said rear opening being closed by an air permeable screen for permitting the passage of air out of said rear opening, but not permitting insects of a pre-selected size to exit therefrom, a manually movable valve for opening and closing a front opening of said transparent collection housing, whereby when said manually movable valve is open, negative pressure from said power assembly housing creates a negative air pressure at the front opening for sucking insects into said transparent collection housing and whereby when said manually movable valve is closed, the valve prevents insects in said transparent collection housing from exiting through said front opening, wherein said manually movable valve is supported for rotation in the front opening thereof between a closed position in which it is perpendicular to an axis of the transparent collection housing and blocks said front opening and an open position in which it is parallel to the axis of said transparent collection housing and maximizes the air flow through the transparent collection housing, and wherein the valve is a lens mounted for rotation within the transparent collection housing to permit viewing of a trapped insect under magnification.

4. The device of claim 3 wherein the transparent collection housing is tubular in shape, and said manually movable valve is supported for rotation in the front opening thereof between a closed position in which it is perpendicular to an axis of the transparent collection housing and blocks said front opening and an open position in which it is parallel to the axis of said transparent collection housing and maximizes the air flow through the transparent collection housing.

5. The device of claim 3 further including a collection nozzle having an upstream opening and a downstream opening, the downstream opening coupled to the front opening of said transparent collection housing.

6. The device of claim 3 further including means for varying a speed of said electric motor and thereby changing a magnitude of said negative air pressure.

7. The device of claim 3 wherein said transparent collection housing has a generally circular cross section.

* * * * *